Patented Feb. 12, 1952

2,585,788

UNITED STATES PATENT OFFICE 2,585,788

METHOD OF PREPARING DENTURES

Nathan G. Kaye, Bradford, R. I.

No Drawing. Application October 9, 1947,
Serial No. 778,761

2 Claims. (Cl. 32—2)

This invention relates to artificial dentures and to the preparation thereof.

The primary object of the present invention is to provide artificial teeth having a proper contacting surface relation in respect to the opposing teeth, respectively, in the oral cavity.

Another object of the invention is the provision of an improved prosthetic procedure for establishing jaw-relationship and tooth selection.

A further object of the invention is the provision of artificial tooth bodies which are well adapted to facilitate the attainment of a proper surface contact relation between opposing teeth of a denture.

A further object of the invention is to provide tooth bodies for the above mentioned purpose of obtaining proper surface contact relation between opposing teeth of the denture, said tooth bodies being further characterized in that they may be used as pattern or trial teeth and then be converted into the final tooth bodies of the denture.

The above mentioned objects of the invention and other objects which might hereinafter appear will be fully understood from the following description.

In accordance with the preferred mode of practicing my invention or the part thereof which resides in establishing the relationship between the jaws, especially in respect to the space in which the teeth are disposed with opposing teeth in surface contact relation, I depart from the known usual procedure of providing rigid bite rims, made of materials which set in the mouth at mouth temperature. More specifically, after the upper and lower base plates are obtained pursuant to the upper and lower impressions of the oral cavity in the usual way, the procedure, in accordance with my invention for establishing the patient's jaw-relationship is as follows:

Instead of wax which sets at mouth temperature and which is usually employed for forming the bite rim in the patient's mouth, I prefer to use a plastic material which is moldable and non-setting in the mouth, at mouth temperature, but which sets when chilled or cooled. An example of such plastic is a composition containing as the ingredients thereof rosin mixed with cerasin wax and mineral oil in the proportions of 16 parts rosin, 4 parts cerasin wax, and 1 part mineral oil. This material for forming the bite rims is placed on the ridge areas of the upper and lower trial bases. In order to prevent the bite rim composition on the upper base plate from adhering to the bite rim composition on the lower base plate in the patient's mouth, the surfaces of the bite rims are dusted with talcum powder, or thin paper or cellophane may be interposed between the upper and lower bite rims. Then the patient is directed to swallow a small quantity of water, and as a result of the act of swallowing, the bite rims are automatically molded to the patient's jaw-relationship. Then the bite rims are chilled and removed from the mouth and the excess of plastic material is removed. The bite rim material is now exposed by removing the talcum or cellophane. The plastic material is slightly heated at the contact surface and the rims are reinserted into the mouth and the patient is allowed to swallow, which brings the rims in contact and causes them to adhere, in the proper jaw relationship. A liquid material which sets by thermal change or chemical action, for example, plaster of Paris, is now injected by a syringe in the patient's mouth in the space existing between the bite rims and labial and buccal aspects. As soon as this injection material is solidified, the bite rims, with the attached solidified injected material, are removed and thereafter used in accordance with known dental practice as a guide in positioning and setting the tooth bodies of the denture in the base plates.

Having thus determined the correct jaw-relationship and having registered the proper labial and buccal aspects the procedure of preparing the dentures in accordance with the present invention is as follows:

Briefly, in accordance with my invention, I provide opposing pattern tooth bodies formed of such material that said opposing bodies wear into proper contact surface relation as a result of the usual mandibular movement of the patient's jaw, as in incising, chewing, swallowing, or speaking, subjecting said tooth bodies to such a movement, in the patient's mouth, for effecting such contact surface relation by mutual wear of the contacting surfaces of the tooth bodies, or by subjecting the tooth bodies to the action of an articulating instrument and then reproducing or preserving the tooth bodies having the same contact surface relation. The tooth bodies having the contact surface relation provided therein may be used solely as pattern teeth, in which case other tooth bodies having the same contact surface relation as the pattern teeth are prepared, or in accordance with the present mode of practising my invention, the pattern teeth themselves are converted into the final teeth of the dentures.

The pattern tooth bodies may be formed of any suitable composition of which artificial teeth are conventionally formed, such as, for example, ceramic compositions or porcelain, or the plastics such as, for example, the acrylic resins. When the tooth body is to be used only as a pattern tooth, I may form the same from a composition consisting of silica or quartz sand of 100–200 mesh particle size, and a binding agent such as plaster of Paris or a suitable plastic such as, for example, methyl methacrylate or a high melting point wax or gum or any other suitable water insoluble binder. The artificial tooth body is formed by molding the same from this composition. Natural or synthetic waxes of high melting point may be used. For example, the pattern tooth body may be molded from a mixture of carnauba wax and silica sand in the proportion of about one to two parts of wax to about two to four parts of silica sand of 80 to 100 mesh or finer. This mixture is formed by melting the wax and mixing the sand thoroughly in the melt. Instead of carnauba wax, candelilla wax or oriqury wax or any other suitable natural or synthetic wax of high melting point may be used. However, I prefer to use a composition which is of such character that the tooth body made therefrom may be used as the pattern tooth body and also, as a result of additional treatment, as the final tooth body of the denture. More particularly, in accordance with this aspect of the invention a pattern tooth body is formed of a ceramic composition or porcelain such as that of which artificial teeth are customarily formed except that in these pattern teeth the composition is in an intermediate state of hardness. A pattern tooth body of this character is obtained by molding the body from the ceramic material or porcelain at a temperature which is lower than the temperature required to obtain the final degree of hardness of the tooth body. More particularly, I mold the tooth body at a temperature of about 2050° F. to about 2150° F. In this intermediate state of hardness resulting from said heat treatment of the composition in the mold, the trial tooth body is of such character that when it is brought into surface contact with an opposing similar tooth body or with an opposing natural tooth structure, the contact surface of the tooth body wears to the correct contacting surface relation with the companion opposing tooth. The wearing or surface contacting operation is performed in the patient's mouth, the pattern tooth bodies being set up on the trial base plates in the usual way. The wearing or surface contacting operation is performed by movement of the patient's jaw as when incising, chewing, swallowing, or speaking, and the operation is accomplished within a few minutes by such mandibular movements. The tooth body, thus has its contact surface correctly formed or patterned to the contacting surface of the opposing tooth of the denture. It will be understood that when the opposing teeth are constituted by the pattern teeth, they produce mutually wearing action on their contacting surfaces, by reason of the above mentioned mandibular movement, and as a result the opposing tooth bodies are provided with the correct contact surface relationship. Similarly when the pattern tooth body is opposite to a natural tooth, the above described mandibular movement will result in the provision of the pattern tooth body with the correct surface contact relationship with the natural tooth. In this connection, it may be noted that while the present invention is especially advantageous for the preparation of dentures for edentulous mouths, it may also be applied to restorations or appliances for mouths which are not edentulous.

The pattern tooth may then be converted to the final tooth of the denture by heat treatment to complete the vitrification or hardening thereof. The temperature for this purpose is the same as that which porcelain tooth bodies are heated as in the customary practice of making artificial teeth. However, instead of preparing the final tooth body of the denture from the pattern tooth, the latter may be used solely as a pattern tooth in which case the final tooth body is prepared from a separate tooth body of the proper degree of hardness and of the same size as the pattern tooth, said final tooth body being modified or reproduced in accordance with indications of the pattern tooth. To facilitate the modification of the separate final tooth body, in accordance with indications of the pattern tooth, a pigment is incorporated in the composition of the pattern tooth material. This pigment will be exposed to view at the point of wear at the surface of the pattern tooth and will appear distinctive only at such points of the surface of the pattern tooth at which wear occurs during the above described surface contact process in the patient's mouth. As an example of a suitable pigment, I may use an aniline dye, an earth or graphite. However, when the pattern tooth is to be subsequently treated so as to become itself the final tooth of the denture, the pigment may be omitted, but, if desired, it may be included in the composition since it will subsequently disappear during the final process for hardening the tooth.

When the pattern tooth is made of a plastic composition such as an acrylic resin, the tooth body is formed from said composition by heating the same in a mold at a temperature of about 160° F. to about 170° F., thus providing the pattern tooth body with an intermediate degree of hardness at which the wear on the contacting surface of said body may be produced by the above described mandibular movement. After the pattern tooth is produced from the acrylic resin composition and modified in the mouth to produce the proper surface contact it can then be treated to the final degree of hardness or be reproduced in any suitable tooth composition suitable for the permanent or final tooth of the denture.

It will be understood that various changes may be made in practicing my invention without departing from the underlying idea or principles of the invention within the scope of the appended claims.

Having thus described my invention, what I claim and desire to secure by Letters Patent is:

1. The method of making dentures using tooth bodies formed of a ceramic composition and having a degree of hardness sufficiently low to result in wear of the incisal and occlusal surfaces of the tooth body as a result of the patient's usual mandibular movements; said method comprising setting said tooth bodies in mutually opposing disposition on base plates to effect contact between confronting surfaces thereof, and subjecting said bodies to mutual wear of the contacting surfaces thereof by simulated mandibular movement in a suitable instrument for obtaining the proper surface-contact relation between opposing tooth bodies, and thereafter treating the tooth body on which said wear is recorded to preserve said contact-surface relation thereof in the denture.

2. The method of making dentures using tooth bodies formed of a composition having a degree of hardness sufficiently low to result in wear of the incisal and occlusal surfaces of the tooth body as a result of the patient's usual mandibular movements; said method comprising setting said tooth bodies in mutually opposing disposition on opposing bases and subjecting said bodies to mutual wear of the contacting surfaces thereof by simulated mandibular movement in a suitable instrument for obtaining the proper surface-contact relation between opposing tooth bodies, and then treating the tooth body on which said wear is recorded to increase the hardness thereof to that of the usual artificial tooth whereby to preserve said contact-surface relation of the tooth bodies in the denture.

NATHAN G. KAYE.

REFERENCES CITED

The following references are of record in the file of this patent:

UNITED STATES PATENTS

| Number | Name | Date |
|---|---|---|
| 2,168,530 | Kyprie | Aug. 8, 1939 |
| 2,220,734 | Shanahan | Nov. 5, 1940 |
| 2,391,925 | Saffir | Jan. 1, 1946 |
| 2,419,084 | Myersen et al. | Apr. 15, 1947 |
| 2,420,570 | Shapiro | May 13, 1947 |